United States Patent [19]

Takizawa et al.

[11] Patent Number: 5,560,708
[45] Date of Patent: Oct. 1, 1996

[54] VENT APPARATUS FOR AN INJECTION MOLDING MACHINE

[75] Inventors: Kiyoto Takizawa; Kazuo Anzai, both of Nagano, Japan

[73] Assignee: Nissei Plastic Industrial Co., Ltd., Nagano-ken, Japan

[21] Appl. No.: 389,392

[22] Filed: Feb. 16, 1995

[30] Foreign Application Priority Data

Feb. 16, 1994 [JP] Japan .................. 6-043247

[51] Int. Cl.⁶ .................................. B29C 45/63
[52] U.S. Cl. .................. 366/75; 425/203; 425/812; 425/815; 425/DIG. 60
[58] Field of Search .................. 366/75, 76.1, 76.6; 425/135, 203, 812, 815, DIG. 60; 264/101, 102, DIG. 78

[56] References Cited

U.S. PATENT DOCUMENTS

| | | | |
|---|---|---|---|
| 3,350,742 | 11/1967 | Wood | 366/75 |
| 3,481,001 | 12/1969 | Stillhard | 425/203 X |
| 3,686,848 | 8/1972 | Miller et al. | 264/168 X |
| 4,060,226 | 11/1977 | Schweller | 366/75 |
| 4,107,787 | 8/1978 | Ocker | 366/75 |
| 4,112,519 | 9/1978 | Kruder | 425/812 X |
| 4,298,322 | 11/1981 | Anders et al. | 366/75 X |
| 4,484,878 | 11/1984 | Anders et al. | 366/75 X |
| 4,846,054 | 7/1989 | Mange et al. | 366/75 X |
| 5,385,462 | 1/1995 | Kodama et al. | 366/75 X |

FOREIGN PATENT DOCUMENTS

| | | | |
|---|---|---|---|
| 59-120435 | 7/1984 | Japan | 264/102 |
| 5261783 | 10/1993 | Japan . | |

*Primary Examiner*—Charles E. Cooley

[57] ABSTRACT

The invention includes a shielding portion having a vent hole for discharging a gas composition G generated from a molten resin R to a barrel cylinder and having a shielding steam holding chamber C formed in connection with the barrel cylinder, the shielding steam holding chamber communicating with the vent hole. A steam supplying portion is provided for supplying a steam S to the shielding holding steam chamber C, and a discharging port portion is provided for discharging the steam S and the gas composition G from the inside of the shielding steam holding chamber C. Thereby, oxidization or carbonization of the molten resin can be prevented. In addition, adverse influence to the natural system can be removed and a decrease in the cost of the apparatus can be realized.

16 Claims, 4 Drawing Sheets

VENT APPARATUS FOR AN INJECTION MOLDING MACHINE

FIELD OF THE INVENTION

The present invention relates to a vent apparatus for an injection molding machine having at a vent hole at a barrel cylinder thereof for discharging a gas composition generated from a molten resin.

DESCRIPTION OF THE RELEVANT ART

Generally, there is known a vent type injection molding machine having a vent apparatus at an intermediate portion of a barrel cylinder. The vent apparatus comprises a vent hole penetrating from an inside to an outside of the barrel cylinder, and has a function of discharging a gas composition generated from a molten resin plasticized inside the barrel cylinder, to the outside through the vent hole.

Since the injection molding machine of this kind has such a structure that the inside and the outside of the barrel cylinder communicate with each other through the vent hole and that principally the molten resin in the barrel cylinder easily contacts the open air, there is a problem that the molten resin in the barrel cylinder is exposed to the open air when the molten resin passes by the vent hole, so that the surface of the molten resin is oxidized or carbonized and the resin which is originally white becomes yellowish or light brownish, depending upon the kind of resin such as polyamide and ABS and the like, then the quality of the molding is extremely lowered.

Accordingly, in order to connect such a problem, as disclosed in a gazette of Japanese Patent Application Laying Open No. 5 (1993)-261783 (U.S. Patent Ser. No. 08/119, 391), the applicant proposed the vent type injection molding machine in which a gas holding chamber is formed therein by covering a portion above the vent hole, and a vent hole cover having a gas exhaust port is disposed on the portion above the vent hole, and an inert gas is supplied to an inside of the vent hole cover, such that a gas shielding layer for shielding the vent hole and the open air is formed in the gas holding chamber to prevent an oxidization of the molten resin or a discoloration and a deterioration due to the carbonization.

However, the above mentioned conventional vent type injection molding machine has the following points to be improved.

First, in a case where a natural environment is considered, since there is a fear that the inert gas influences the ecological system, it is not preferable to utilize the inert gas positively.

Second, since $N_2$ (nitrogen gas) and $CO_2$ (carbonic acid gas) and the like are normally utilized as the inert gas, the cost of the inert gas and the equipment for supplying the inert gas and the like is high. Further, since the presence of the inert gas cannot be detected easily, the high cost inert gas detecting equipment and the like are also necessary.

SUMMARY OF THE INVENTION

It is an object of the present invention to ensure the essential advantage of preventing the oxidization or the carbonization of the molten resin, and further to provide a vent apparatus for an injection molding machine which is adapted to prevent an influence to the natural system (natural environment).

Moreover, it is another object to provide a vent apparatus for an injection molding machine for making use of expensive the inert gas unnecessary, further for detecting extremely easily a shield medium for shielding the vent hole, and realizing a sharp decreasing of the cost by directly utilizing a heat of the barrel cylinder.

Furthermore, it is still another object of the present invention to provide a vent apparatus for an injection molding machine which enables a selection of various embodiments to enhance a wide and ease of use.

In order to attain the above mentioned objects, the invention includes a vent hole shielding portion 4 being provided with a vent hole 3 for discharging a gas composition G generated from a molten resin R to a barrel cylinder 2 and having at an inside thereof a shielding steam holding chamber C surrounding an outside of the vent hole 3 and communicating with the vent hole, a steam supplying portion 5 for supplying a steam S to the shielding steam holding chamber C, and a discharging port portion 6 for discharging the steam and the gas composition from inside the shielding steam holding chamber.

In this case, the stream supplying portion 5 can include a water receiving portion 11 disposed on an inside of the shielding steam holding chamber C, a water feeding portion 12 fox supplying the water W to the water receiving portion 11, and a heating portion 13a for heating the water receiving portion 11. Incidentally, the water receiving portion 11 has a constant depth and is heated by heat from the barrel cylinder 2, therefore the barrel cylinder 2 can serve as the heating portion 13a. Moreover, as the steam supplying portion 5, the outer steam generating 14a, portion 14a, 14b for supplying the steam S to the shielding steam holding chamber C can be utilized. On the one hand, the apparatus can be provided with a steam detecting portion 15 for detecting the presence of the steam S, and the steam detecting portion 15 can use a water sensor for detecting the presence of the water W of the Water receiving portion 11. Still further, the discharging port portion 6 can be constituted by an atmospheric discharging port 6a communicating directly with the atmosphere, and the discharging port portion 6 can be attached with a lid 21 for covering the atmospheric discharging port 6a and having an opening and closing valve function. On the other hand, the discharging port portion 6 can be connected with a forced suction portion 18 for ensuring a suction by a gas suction pump to ensure a forced exhaust of the gas.

Thereby, the steam S is supplied from the steam supplying portion 5 to the shielding steam holding chamber C. In this case, where the steam supplying portion 5 is constituted by the water receiving portion 11 disposed on the inside of the shielding steam holding chamber C, the water feeding portion 12 for supplying the water W to the water receiving portion 11, and the heating portion 13 for heating the water receiving portion 11, the water W is supplied from the water feeding portion 12 to the water receiving portion 11, then the steam S is generated from the water receiving portion 11 heated by the heating portion 13a. As a result, the steam S is filled in the shielding steam holding chamber C disposed on the inside of the vent hole shielding portion 4 communicated with the vent hole 3, and a shielding layer for shielding=the vent hole 3 and the open air is formed inside the shielding steam holding chamber C Moreover, the same shielding layer is formed by generating the steam S by means of the outer steam generating portion 14a, 14b and supplying the generated steam S to the shielding steam holding chamber C, also.

Therefore, the molten resin R inside the barrel cylinder 2 and the atmosphere is shielded by the shielding layer and the molten resin R is prevented from oxidizing (carbonizing). In this case, since the steam S inside the shielding steam holding chamber C contacts the molten resin R through the vent hole 3, there is a fear that the water molecule of the steam S is resolved to oxidize the molten resin R in a case where the temperature inside the shielding steam holding chamber C is too high. Accordingly, the temperature inside the shielding steam holding chamber C is set at a temperature at which the water molecule is resolved. Normally, since the temperature of the barrel cylinder 2 is 350° C. there is not caused a problem in a case where the conducted heat from the barrel cylinder is utilized. However, it is preferable to set the temperature of the shielding steam holding chamber C at a temperature lower than the temperature of the barrel cylinder 2 in a case where the other steam generating heater is utilized. Thereby, the steam S remains as the water molecule, and an effect apparently the same as that of the inert gas is obtained.

On the one hand, since they shielding steam holding chamber C is supplied one after another with the gas composition G from the molten resin G and the steam S from the steam supplying portion 5, the gas composition G and the steam S inside the shielding steam holding chamber C is discharged one after another to the atmosphere through the discharging port portion 6. At this occasion, in a case where the discharging port portion 6 is constituted by the natural discharging port 6a, the gas composition G and the steam S is released from the natural discharging port 6a to the outside due to a natural convection, and in a case where the forced suction portion 18 is connected to the steam discharging port 6, the gas composition G and the steam S are sucked by the suction pump 17 to be forcibly exhausted.

On the other hand, in a case where the steam detecting portion 15 capable of detecting the water W in the water receiving portion 11 is provided, the presence of the steam S can be monitored indirectly. So, for example, the steam S is supplied when necessary, otherwise the abnormal condition in which the steam S is not present can be detected.

DESCRIPTION OF THE PREFERRED EMBODIMENTS

The most preferred embodiment of the invention will be explained in detail hereinafter with reference to the drawings.

Figure 1:
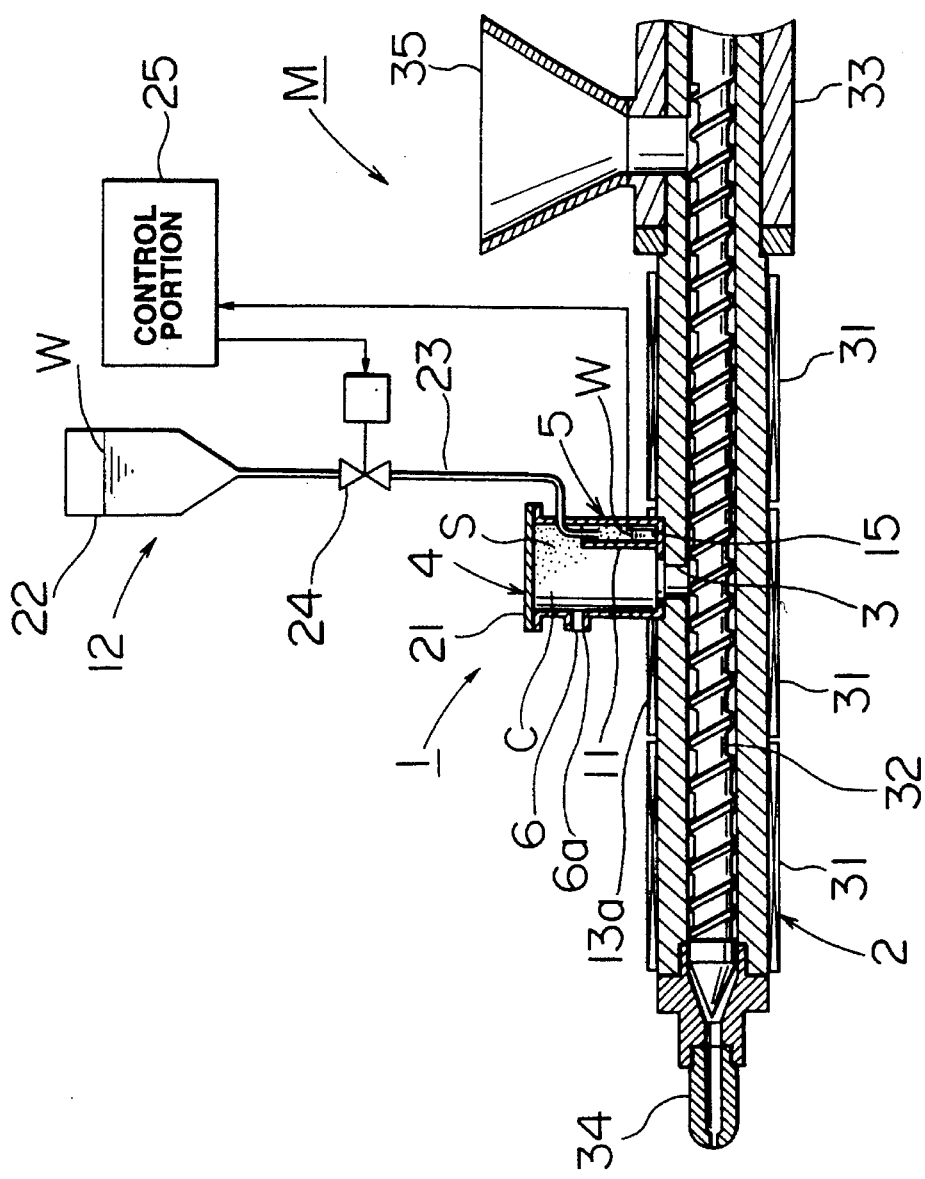
FIG. 1 is a longitudinal sectional side view of an injection apparatus in an =injection molding machine including a vent apparatus according to the invention.

First, the construction of the vent apparatus 1 according to the basic embodiment of the invention will be explained with reference to FIGS. 1 through 3.

Reference symbol M denotes an injection apparatus in the injection molding machine, which is provided with a barrel cylinder 2 having band heaters 31. The barrel cylinder 2 is built in with a screw 32 and is connected to a leading end portion 33 of an injection cylinder (not shown) at a rear end thereof. Also, the barrel cylinder 2 is provided with an injection nozzle 34 at a leading end thereof, and is provided with a hopper 35 for supplying a resin material, at a rear end thereof.

On the one hand, a vent hole 3 opening upward is disposed on an upper face portion of the barrel cylinder 2 at an intermediate position in a fore and rear direction, and a vent hole shielding portion 4 is disposed on an outer side of the vent hole 3. The vent hole shielding portion 4 is formed in a cylinder, and is attached at a lower end face thereof to the upper face portion of the barrel cylinder 2 at which the vent hole 3 is positioned. Thereby, a portion above the vent hole 3 is surrounded by the vent hole shielding portion 4, and the inside Of the vent hole shielding portion 4 and the vent hole 3 communicate with each other. Moreover, a discharging port portion 6 as a natural discharging port 6a is disposed on an upper portion of a side face 4s of the vent hole shielding portion 4, and an upper end of the vent hole shielding portion 4 is opened and is provided with an opening and closing lid 21. A shielding steam holding chamber C is formed inside the vent hole shielding portion 4.

On the other hand, a steam supplying portion 5 for supplying a steam S to the shielding steam holding chamber C is. The steam supplying portion 5 is provided with a water receiving portion 11 disposed inside the shielding steam holding chamber C and is provided with a water feeding portion 12 for supplying water W to the water receiving portion 11. In this case, this water receiving portion 11 is disposed integrally on an inner face of the vent hole shielding portion 4, and is opened at an upper end thereof, so that it is formed in such a contour as to enable storage of the water W therein. Moreover, the water receiving portion 11 has a constant depth, which enables prevention of waterdrops from scattering into the Shielding steam holding chamber C. Also, the water feed portion 12 comprises a water storage tank 22 disposed above an outer portion of the vent hole shielding portion 4, a water feed pipe 23 for supplying the water W to the water receiving portion 11 from the water storage tank 22 through the side face 4a of the vent hole shielding portion 4, and a control valve 24 disposed at an intermediate portion of the water feed pipe for controlling an amount of feed water, and further comprises a water sensor 16 disposed on a bottom face of the water receiving portion 11 and constitutable by, for example, a pair of detecting electrodes spaced apart from each other, and a control portion 25 for receiving a detecting result of the water sensor 16 to control the control valve 24. Further, the band heaters 131 disposed on the barrel cylinder 2 question as the heater 13a for heating the water receiving portion 11. In this case, since the intermediate portion of the barrel cylinder 2 in the fore and rear direction is normally heated up to about 350° C., the water receiving portion 11 of the vent hole shielding portion 5 directly disposed on the barrel cylinder 2 is fully heated at the bottom face thereof due to the heat conduction from the barrel cylinder 2. Accordingly, in this case, another heating portion turns out to be unnecessary.

Next, the principal function of the vent apparatus 1 according to the basic embodiment will be explained with reference to FIGS. 1 through 3.

First, at the time of molding, the control valve 24 is controlled at a predetermined opening, and the water is supplied to the water receiving portion 11 from the water storage tank 22. Since the water receiving portion 11 is heated up to 350° C. due to the heat conduction from the barrel cylinder 2, the water in the water receiving portion 11 becomes the steam S to be supplied to the shielding steam holding chamber C As a result, a shielding layer for shielding the vent hole 3 and the open air is formed inside the shielding steam holding chamber C located at an inside of the vent hole shielding portion 4 covering the vent hole 3. Accordingly, the molten resin R inside the barrel cylinder 2 and the open air are shielded to prevent the molten resin R from oxidizing (carbonizing).

Figure 2:
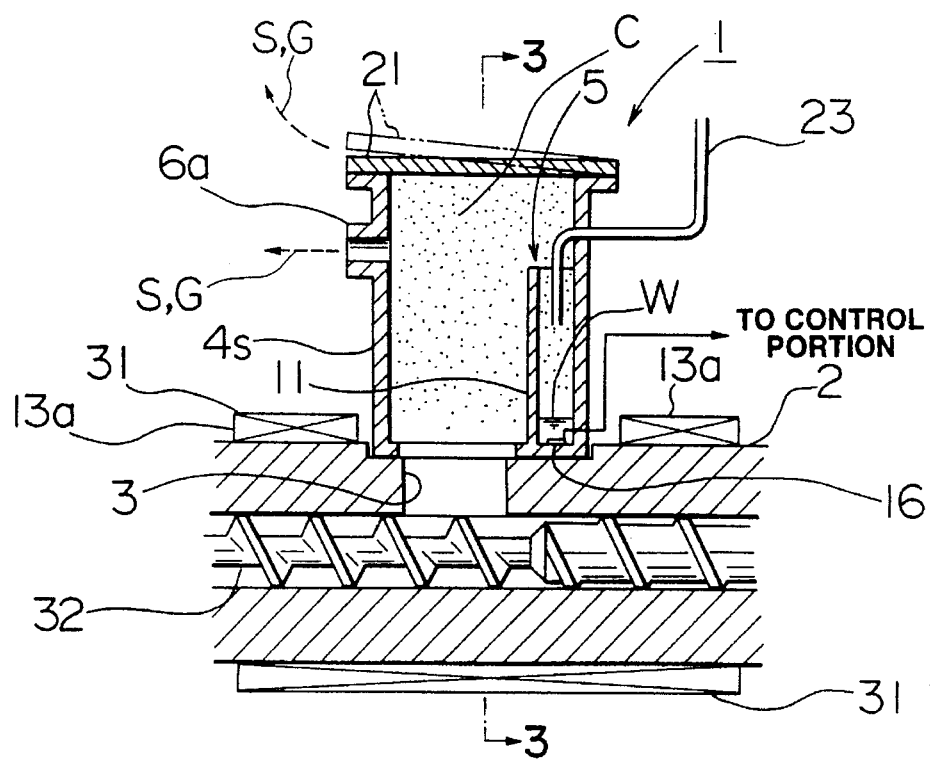
FIG. 2 is an enlarged longitudinal sectional side view of the vent apparatus shown in FIG. 1.
Figure 3:
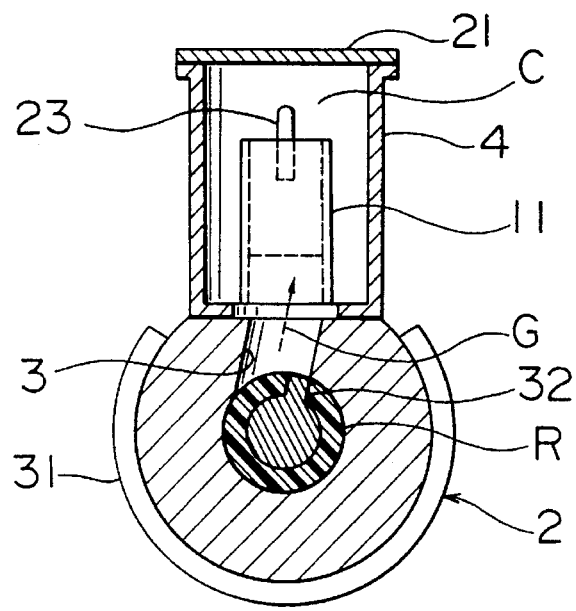
FIG. 3 is a sectional view taken along the line 3—3 of FIG. 2.

In this case, since the gas composition G generated from the molten resin R and the steam S supplied from the steam supplying portion 5 are filled in the shielding steam holding chamber C, and the gas composition G and the steam supplying portion 5 are high in temperature, they are discharged to the atmosphere from the natural discharging port 6a disposed on the upper portion of the vent hole shielding portion 4 due to natural convection, as shown in FIG. 2. Moreover, in a case where the gas composition G is generated in large quantities, and the pressure in the shielding steam holding chamber C is raised, the lid 21 disposed on an upper end of the vent hole shielding portion 4 is opened and the gas composition G is released to the atmosphere.

Moreover, at this occasion, since the shielding steam holding chamber C has a constant volume and the lid 21 has the opening and closing valve function, the steam holding chamber C is hermetically sealed at a pressure lower than a predetermined value and then the steam S stays therein, there is formed a gas composition shielding layer for shielding an inside and an outside of the vent hole 3. Particularly, the lid 21 performs an important function, the gas composition G of a high temperature generated from the molten resin R initially remains in the steam holding chamber C by means of the hermetically sealed steam holding chamber C when it intrudes into the steam holding chamber C, moved upward due to an exchange to the gas composition shielding layer based on natural convection, and after that the gas composition G is discharged to the outside as the steam S remains. That is, the lid 21 has a function of delaying by a constant time the discharge of gas composition G.

On the other hand, if the presence of the water W in the water receiving portion 11 is detected by the water sensor 16, the presence of the steam S can be monitored indirectly, for example, the steam S can fill the shielding steam holding chamber C when necessary, and the abnormal condition at which the steam S is not present can be detected. Accordingly, since there is no fear that the molten resin R will contact to the open air when the gas composition G is generated from the molten resin R in great quantities as mentioned above, the discharge of the gas composition G can be accelerated by stopping a supply the steam S. In this case, the pressure in the shielding steam holding chamber C is detected by a pressure sensor, so that the supply of the steam S can be stopped by judging that the gas composition is generated in large quantities if the pressure is high. Moreover, the generated amount of the steam S (equilibrium state) is changed due to atmosphere, temperature and pressure; for example, the generated amount increases as the pressure: in the steam holding chamber C decreases at a certain temperature and decreases naturally as the pressure becomes high. Therefore, the pressure in the steam holding chamber C is maintained at a constant value if it is monitored by the water sensor 16 in such a manner that the water W does not run short.

Next, the vent apparatus 1 according to the alternative embodiments of the invention will be explained with reference to FIGS. 4 through 6.

Figure 4:
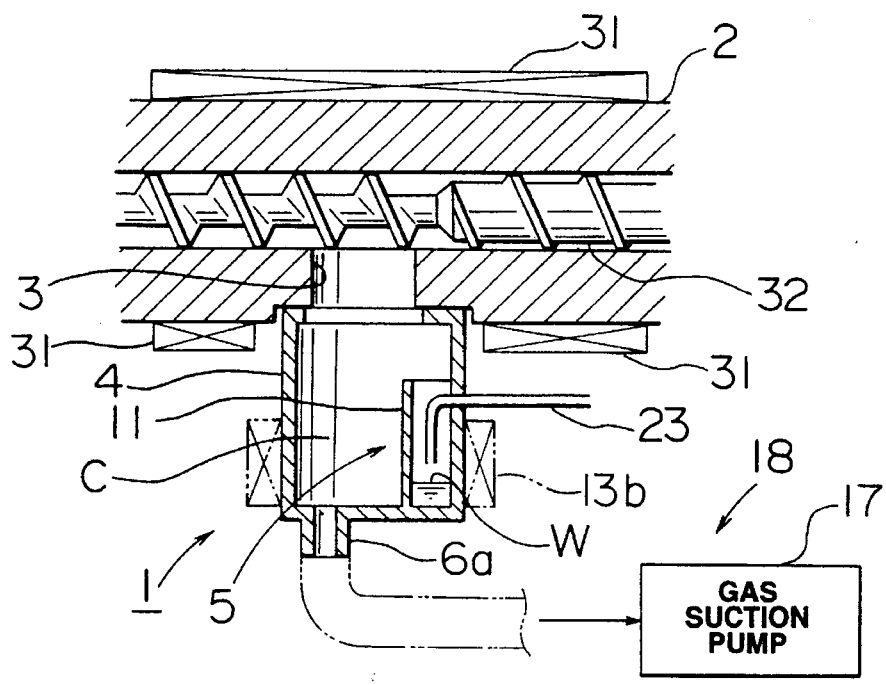
FIG. 4 is a longitudinal sectional side view of the vent apparatus according to a first alternative embodiment of the invent ion.

FIG. 4 shows the first alternative embodiment. The first alternative embodiment shows a case in which the vent hole 3 is applied to the vent apparatus 1 disposed on the lower face portion of the barrel cylinder 2 at a substantially intermediate position, and the barrel cylinder 2 is attached with the vent hole shielding portion 4 surrounding the vent hole 3 as in the basic embodiment. The discharging port portion 6 is disposed on the lower face of the vent hole shielding portion 4. In this case, the discharging port portion 6 may serve as the natural discharging port 6a as in the basic embodiment, and by disposing the forced suction portion 18, the gas composition G and the steam S inside the shielding steam holding chamber may be exhausted forcidly from the natural discharging port 6a by utilizing the suction pump 17. Moreover, since the vent hole shielding portion 4 is disposed on the lower face of the barrel cylinder 2, although it is considered that the conducted heat to the water receiving portion 11 from the barrel cylinder 2 is short, the water receiving portion 11 is heated at a temperature which will generate the steam because the temperature of the barrel cylinder 2 is at about 350° C. However, in a case where the conducted heat is short, a heating heater (heating portion 13b) shown by the virtual line can be disposed on the outer periphery of the vent hole shielding portion 4. The remaining structure can be constituted according to the above mentioned basic embodiment. Therefore, the portions in FIG. 4 which are the same as those of FIGS. 1 and 2 are numbered with the same reference numerals, so that the construction there of is clarified.

Figure 5:
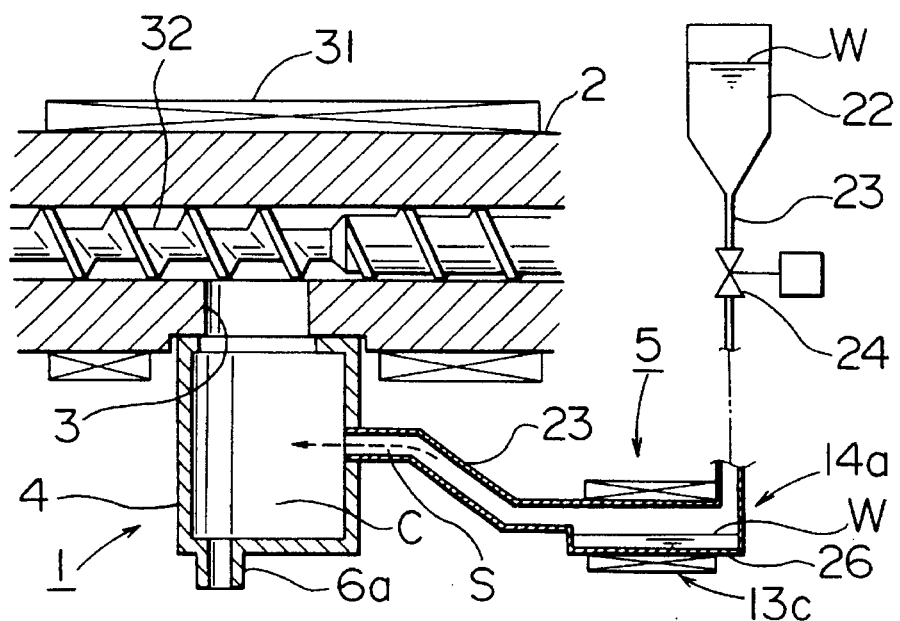
FIG. 5 is a longitudinal sectional side view of the vent apparatus according to a second alternative embodiment of the invention.

Also, FIG. 5 shows the second alternative embodiment. The second alternative embodiment shows the:case in which the outer steam generating portion 14a is disposed on the outside of the vent hole shielding portion 4. The outer steam generating portion 14a is constituted by disposing the water receiving portion 26 on an intermediate portion of the water feed pipe 23 between the control valve 24 and the vent hole shielding portion 4 and disposing on the water receiving portion 26 the heating portion 13c using the heating heater. Thereby, the steam S is generated form the water receiving portion 26 and the generated steam S is supplied into the shielding steam holding chamber C. The remaining structure can be constituted as in the above mentioned basic embodiment and the first alternative embodiment. Therefore, the portions in FIG. 5 which are the same as those of FIGS. 1, 2 and 4 are numbered with the same reference numerals, so that the construction thereof is clarified.

Figure 6:
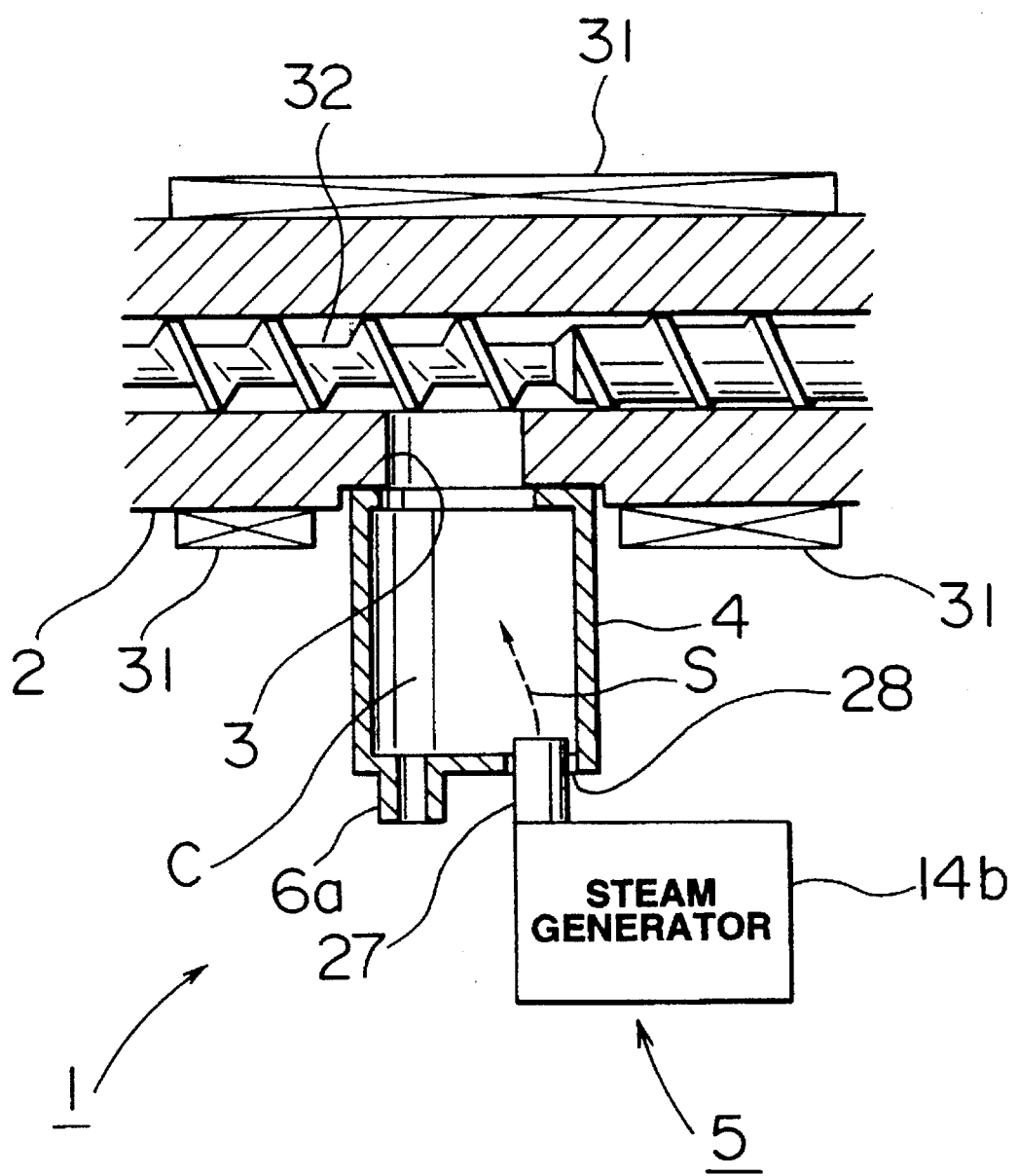
FIG. 6 is a longitudinal sectional side view of the vent apparatus according to a third alternative embodiment of the invention.

Furthermore, FIG. 6 shows the third alternative embodiment. The third alternative embodiment shows the case in which the outer steam generating portion 14b different from that of the second alternative embodiment is disposed on the outside of the vent hole shielding portion 4. The outer steam generating portion 14b is formed independently from the vent hole shielding portion 4, and has a function of releasing the steam S generated therein through the steam generating port 27. Accordingly, if the steam generating port 27 is inserted into an opening portion 28 disposed on the lower face of the outer steam generating portion 14b, the steam S generated from the outer steam generating portion 14b can be supplied to the shielding steam holding chamber C inside the vent hole shielding portion 4. In this case, a humidifier can be used for the outer steam generating portion 14b. The remaining structure can be constructed similar to the above mentioned basic embodiment and the second alternative embodiment. Therefore, the portions in FIG. 6 which are the same as those of FIGS. 1, 2 and 5 are numbered with the same reference numerals, so that the construction of is clarified.

Incidentally, in a case where the outer steam generating portion 14a, 14b is used, the generated amount of the steam S can be adjusted by detecting the pressure in the steam holding chamber C by the pressure senor.

As described above, the embodiments are explained in detail, however, the invention should not be limited to such embodiments. For example, the embodiment shows the case in which the water receiving portion receiving the water is disposed, but the waterdrops may be dropped directly onto the bottom face of the vent hole shielding portion. And, the water can be controlled so as not to be supplied too much by disposing the water level sensor for detecting the upper level of the water. Otherwise, the detailed structure, and the method and the like can be modified optionally without departing from the spirit of the invention.

What is claimed is:

1. A vent apparatus for an injection molding machine, comprising:

a heating cylinder provided with a vent hole for exhausting a gas component generated from a melted resin;

a vent hole cover, covering said vent hole, having a gas exhaust port at an upper portion including a lid which functions as a valve for selectively opening said gas exhaust port to relieve excessive pressure, wherein a gas holding chamber is formed at an interior of said vent hole cover;

an atmospheric discharging port portion formed in a wall of said vent hole cover; and means for supplying steam to the gas holding chamber, wherein said atmospheric discharging port continuously discharges steam and gas from the gas holding chamber to the atmosphere and said lid selectively opens for exhausting excessive pressures of steam and gas from the gas holding chamber.

2. The vent apparatus for an injection molding machine according to claim 1, wherein said means for supplying steam includes a steam supplying portion having a water receiving portion disposed within the gas holding chamber, a water feed portion for supplying water to the water receiving portion, and a heating portion for heating the water receiving portion.

3. The vent apparatus for an injection molding machine according to claim 2, wherein the water receiving portion has a constant depth.

4. The vent apparatus for an injection molding machine according to claim 2, wherein the water receiving portion is heated by a heat dissipating from an outer surface of the heating cylinder, such that the heating cylinder functions as the heating portion.

5. The vent apparatus for an injection molding machine according to claim 2, further comprising a steam detecting portion formed within the water receiving portion for detecting the presence of steam.

6. The vent apparatus for an injection molding machine according to claim 5, wherein the steam detecting portion utilizes a water sensor for detecting the presence of the water in the water receiving portion.

7. The vent apparatus for an injection molding machine according to claim 1, wherein said means for supplying steam includes a steam generating portion mounted exterior to the gas holding chamber.

8. The vent apparatus for an injection molding machine according to claim 1, wherein the atmospheric discharging port portion is a discharging port directly communicating with the atmosphere.

9. The vent apparatus for an injection molding machine according to claim 1, wherein the atmospheric discharging port portion is connected with a forced suction portion for performing a forced exhaust by a suction of a gas suction pump.

10. A vent apparatus for an injection molding machine, comprising:

a heating cylinder provided with a vent hole for exhausting a gas component generated from a melted resin;

a vent hole cover, covering said vent hole, having a gas exhaust port at an upper portion including a lid which functions as a valve for selectively opening said gas exhaust port to relieve excessive pressure, wherein a gas holding chamber is formed at an interior of said vent hole cover;

an atmospheric discharging port portion formed in a wall of said vent hole cover; and a steam supplying portion, said steam supplying portion including a water receiving portion disposed within the gas holding chamber, a water feed portion for supplying water to the water receiving portion, and a heating portion for heating the water receiving portion;

wherein said atmospheric discharging port continuously discharges steam and gas from the gas holding chamber to the atmosphere and said lid selectively opens for exhausting excessive pressures of steam and gas from the gas holding chamber.

11. The vent apparatus for an injection molding machine according to claim 10, wherein the water receiving portion has a constant depth.

12. The vent apparatus for an injection molding machine according to claim 10, wherein the water receiving portion is heated by a heat dissipating from an outer surface of the heating cylinder, such that the heating cylinder functions as the heating portion.

13. The vent apparatus for an injection molding machine according to claim 10, further comprising a steam detecting portion formed within the water receiving portion for detecting the presence of steam.

14. The vent apparatus for an injection molding machine according to claim 13, wherein the steam detecting portion utilizes a water sensor for detecting the presence of the water in the water receiving portion.

15. The vent apparatus for an injection molding machine according to claim 10, wherein the atmospheric discharging port portion is a discharging port directly communicating with the atmosphere.

16. The vent apparatus for an injection molding machine according to claim 10, wherein the atmospheric discharging port portion is connected with a forced suction portion for performing a forced exhaust by a suction of a gas suction pump.

* * * * *